US010614190B2

(12) United States Patent
Chidambarrao et al.

(10) Patent No.: US 10,614,190 B2
(45) Date of Patent: Apr. 7, 2020

(54) DEEP TRENCH FLOORPLAN DISTRIBUTION DESIGN METHODOLOGY FOR SEMICONDUCTOR MANUFACTURING

(71) Applicant: INTERNATIONAL BUSINESS MACHINES CORPORATION, Armonk, NY (US)

(72) Inventors: Dureseti Chidambarrao, Weston, CT (US); Frank Malgioglio, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/023,379

(22) Filed: Jun. 29, 2018

(65) Prior Publication Data
US 2020/0004910 A1   Jan. 2, 2020

(51) Int. Cl.
G06F 17/50   (2006.01)

(52) U.S. Cl.
CPC ...... *G06F 17/5072* (2013.01); *G06F 17/5036* (2013.01); *G06F 17/5081* (2013.01)

(58) Field of Classification Search
CPC ............. G06F 17/5072; G06F 17/5081; G06F 17/5036
See application file for complete search history.

(56) References Cited

U.S. PATENT DOCUMENTS

| 6,185,472 | B1 * | 2/2001 | Onga | G06F 17/5018 257/E21.525 |
| 7,192,845 | B2 * | 3/2007 | Yen | H01L 23/544 257/797 |
| 7,383,521 | B2 * | 6/2008 | Smith | G06F 17/5068 716/114 |
| 8,108,802 | B2 * | 1/2012 | Rosenbluth | G03F 1/70 716/50 |
| 8,679,938 | B2 | 3/2014 | Fang et al. | |
| 9,032,358 | B2 | 5/2015 | Srinivas et al. | |

(Continued)

FOREIGN PATENT DOCUMENTS

WO      0019343      4/2000

OTHER PUBLICATIONS

K. Kundert, et al.,"Design of Mixed-Signal Systems on Chip", IEEE, Transactions on Computer-Aided Design of Integrated Circuits and Systems, Mar. 29, 2001, p. 1-12.

*Primary Examiner* — Naum Levin
(74) *Attorney, Agent, or Firm* — Cantor Colburn LLP; Alvin Borromeo

(57) ABSTRACT

Embodiments include method, systems and computer program products for designing physical devices using an iterative floorplan methodology. The method creating, using a processor, a rough floorplan, wherein the rough floorplan includes one or more tiles and estimates for one or more components associated with the floorplan. The processor converts the estimates for the one or more components to stresses and displacements/distortions associated with the one or more tiles. The processor further generates distortion data from the displacements/distortions associated with the one or more tiles. The processor further compares the distortion data to a threshold. The processor further creates a finalized floorplan based on the rough floorplan in response to the distortion data being below the threshold.

18 Claims, 4 Drawing Sheets

(56) References Cited

U.S. PATENT DOCUMENTS

| | | | |
|---|---|---|---|
| 9,311,443 B2 | 4/2016 | Chidambarrao et al. | |
| 9,424,384 B2 | 8/2016 | Yang et al. | |
| 9,997,348 B2 * | 6/2018 | Brunner | H01L 21/302 |
| 2005/0268268 A1 | 12/2005 | Wang et al. | |

* cited by examiner

DEEP TRENCH FLOORPLAN DISTRIBUTION DESIGN METHODOLOGY FOR SEMICONDUCTOR MANUFACTURING

BACKGROUND

The present invention relates to manufacturing of semiconductor chips, device and structures, and more specifically, to implementing systems and processes to minimize reticle distortions induced by deep trench (DT) stresses through iterative modeling and floor planning of semiconductor devices.

Integrated circuit (IC) design involves the creation of electronic components, such as transistors, resistors, capacitors and the metallic interconnect of these components onto a piece of semiconductor, typically silicon. IC design can entail several steps. For example, the IC design can involve creating a functional specification, converting the specification to a register transfer level (RTL) description, and during a physical design, using the RTL to create one or more semiconductor chips.

A floorplan of an IC is a schematic representation of the tentative placement of major functional blocks on the integrated circuit. In a floorplan, the RTL of a semiconductor chip is assigned to gross regions of the chip, input/output (I/O) pins are assigned and large objects (arrays, cores, etc.) are placed. In addition, spacing for the objects is determined and conflicts related to available space (cost of the chip), required performance, and compactness of the chip are addressed.

SUMMARY

Embodiments of the invention are directed to a method for designing physical devices using an iterative floorplan methodology. A non-limiting example of the computer-implemented method includes creating, using a processor, a rough floorplan, wherein the rough floorplan includes one or more tiles and estimates for one or more components associated with the floorplan. The processor converts the estimates for the one or more components to stresses and displacements/distortions associated with the one or more tiles. The processor further generates distortion data from the displacements/distortions associated with the one or more tiles. The processor further compares the distortion data to a threshold. The processor further creates a finalized floorplan based on the rough floorplan in response to the distortion data being below the threshold.

Embodiments of the invention are directed to a computer program product that can include a storage medium readable by a processing circuit that can store instructions for execution by the processing circuit for performing a method for designing physical devices using an iterative floorplan methodology. The method includes creating a rough floorplan, wherein the rough floorplan includes one or more tiles and estimates for one or more components associated with the floorplan. The processor converts the estimates for the one or more components to stresses and displacements/distortions associated with the one or more tiles. The processor further generates distortion data from the displacements/distortions associated with the one or more tiles. The processor further compares the distortion data to a threshold. The processor further creates a finalized floorplan based on the rough floorplan in response to the distortion data being below the threshold. Embodiments of the invention are directed to a system. The system can include a processor in communication with one or more types of memory. The processor can be configured to create a rough floorplan, wherein the rough floorplan includes one or more tiles and estimates for one or more components associated with the floorplan. The processor can be configured to convert the estimates for the one or more components to stresses and displacements/distortions associated with the one or more tiles. The processor can be configured to generate distortion data from the displacements/distortions associated with the one or more tiles. The processor can be configured to compare the distortion data to a threshold. The processor can be configured to create a finalized floorplan based on the rough floorplan in response to the distortion data being below the threshold.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
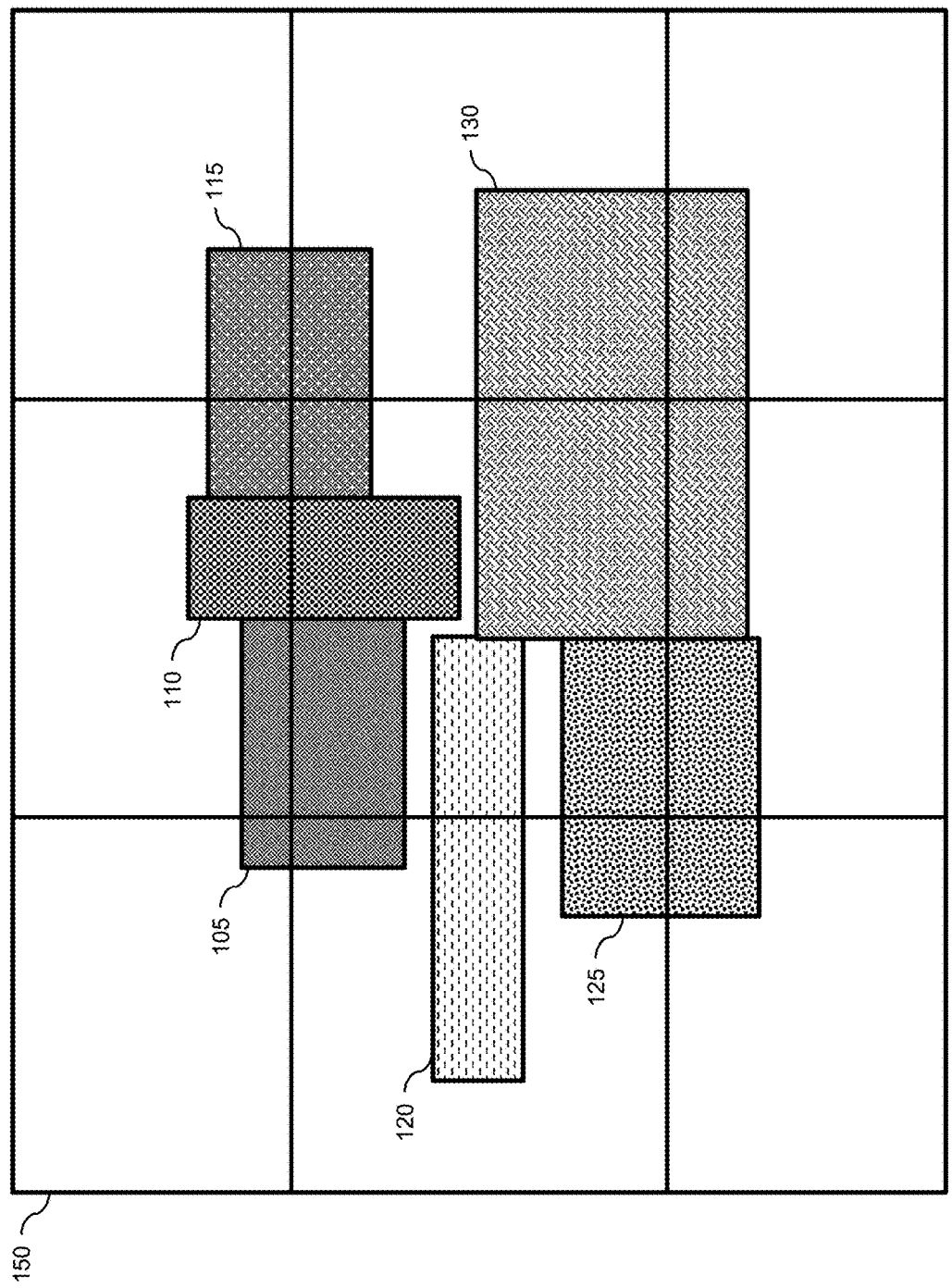
FIG. 1 is an illustration of a floorplan according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for designing physical devices using an iterative floorplan methodology is described herewith.

Turning now to an overview of technologies that are more specifically relevant to aspects of the invention, embodiments of the invention are related in general to implementing a floorplan distribution design methodology. In a floorplan, designers determine a tentative placement of components for a semiconductor chip (test chip). Often when designing the test chip, designers do not know what DT densities for the components of the test chip should be used to prevent high DT gradients, which can introduce out-of-plane chip displacements/distortions due to non-uniform DT densities. If the distortions introduced during test chip design are greater than a threshold level, for example, 70 nanometers (nm), semiconductor chips produced based on the test chip design will often encounter front end of line/middle of line/first metal level (M1) lithography/polish issues, as well as major yield degrade. Accordingly, semiconductor chips produced based on test chip designs having distortions over the threshold are often inoperable.

Turning now to an overview of aspects of the present invention, one or more embodiments of the invention provide methods, systems, structures and computer program products configured to implement a floorplan distribution design methodology that can be used to more accurately reflect deep trench (DT) densities of proposed chip designs prior to production of the proposed chip. Instead of waiting till later stages of chip design, for example, physical device production, DT densities in tiles can be considered and addressed at the floorplan stage, i.e., before the semiconductor chip has been physically designed. Course/rough DT densities can be assigned to each component of the test semiconductor chip based on DT estimates assigned to each component type associated with the semiconductor chip. A model of out-of-plane distortions for the semiconductor chip is created based on the assigned coarse/rough tile DT densities. Distortion data from the model can be compared to a distortion threshold. If the distortion data is below the threshold, the modeled semiconductor chip design proceeds to productions. If the distortion data is above the threshold, the floorplan is redesigned to reduce DT densities for the semiconductor ship.

The above-described aspects of the invention address the shortcomings of the prior art by minimizing out-of-plane distortions to processable levels during a floorplan stage of IC design. The invention can also reduce semiconductor chip waste because the production of physical devices whose design modeling at the floorplan stage is below the threshold thereby indicating a higher likelihood of operability when a physical device is fabricated can be avoided.

With reference now to the figures, FIG. 1 depicts an exemplary floorplan 100 in which aspects of the illustrative embodiments of the present invention may be implemented. The floorplan 100 can include a plurality of components (e.g., 105, 110, 115, 120, 125 and 130) intended to be included on a semiconductor chip, as well as indicate a tentative location and placement of each component on the semiconductor chip. The floorplan 100 can also include one or more tiles 150, for example, 100 tiles by 100 tiles. Deep trench (DT) estimates can be used to create the one or more tiles 150. The DT estimates can be established for various component types and regions associated with the one or more tiles 150, (e.g., DRAM, SRAM, I/O units, regular logic, chip whitespace, etc.). As a design of the floorplan 100 evolves from a crude/rough floorplan to a finalized (actual) floorplan, the DT estimates for each component can be replaced by actual DT density values.

The tiles 150 can be used for density calculations for the semiconductor chip. The density calculation can be based on the DT density estimates, as well as the actual DT density values once finalized. Density calculations can be a standard computation related to an area of shapes divided an area of a unit cell for the semiconductor chip.

Figure 2:
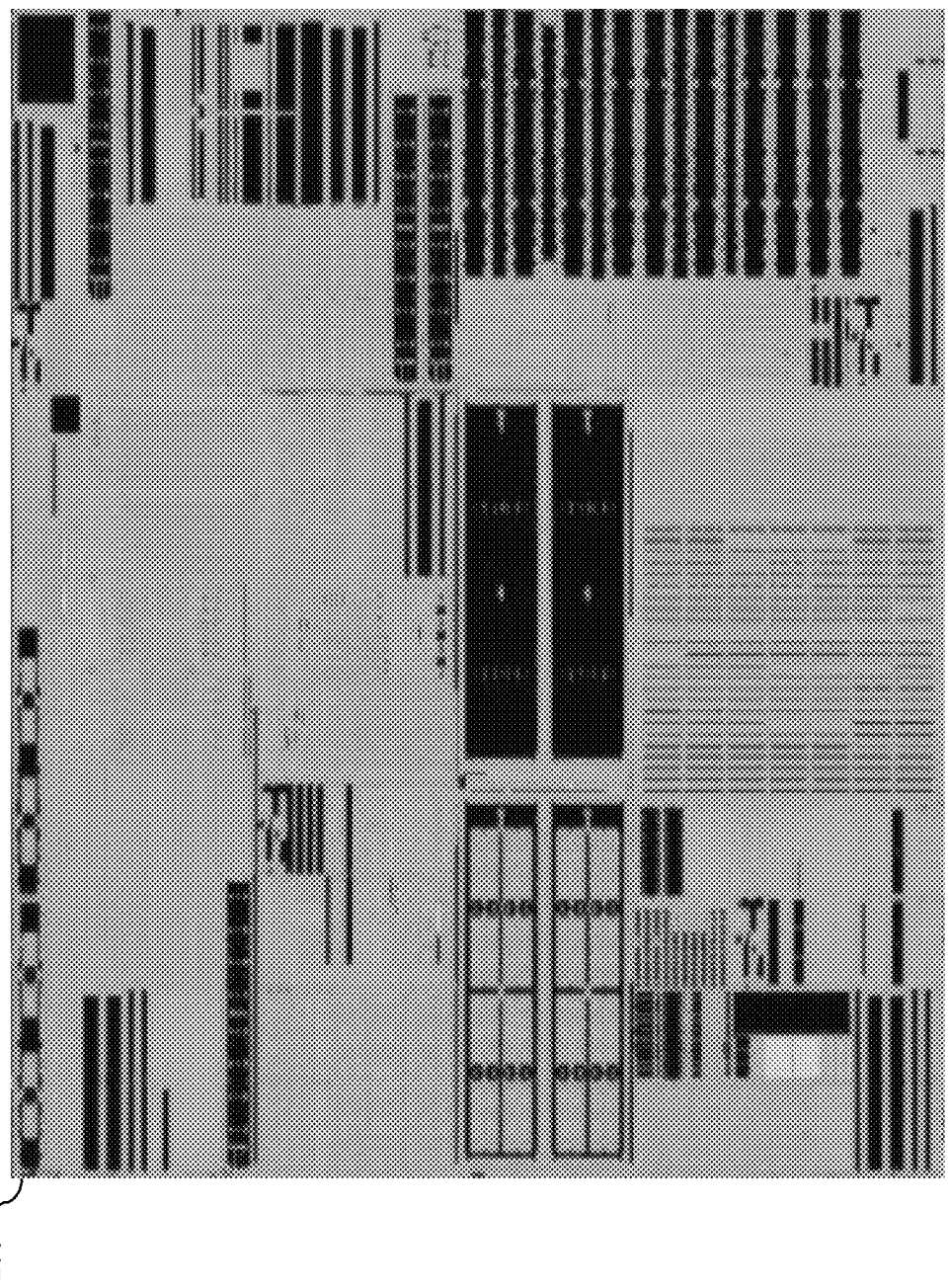
FIG. 2 is an illustration of a deep trench density map according to one or more embodiments of the present invention.

With reference now to FIG. 2, depicts an exemplary DT density map 200 for floorplan 100 in which aspects of the illustrative embodiments of the present invention may be implemented. Semiconductor chip 205 includes a variety of components. Each component can have an assigned DT density. The assigned DT density can be a default DT density based on a circuit type associated with a component (i.e., low, medium, and high value is defined per each type). The assigned DT density can be based on an associated function. The assigned DT density can also be a fixed or variable DT density based on a circuit type associated with a component. For example, embedded DRAM (eDRAM) can be assigned 11.7%, SRAM can be assigned 0%, register files (regFiles) can be assigned 1%, I/O can be assigned 4%, RLM/LBS can be assigned a specific value ranging from 0-4%, and Unit and chip white space can be assigned a specific number ranging from 0-8%. The assigned values can be starting values, which can be subsequently changed in an iterative process. Accordingly, specific tile DT densities can be changed at any stage of the iterative process.

In the density map 200, components with lighter shading can have a higher DT density, while components with darker shading can have a lower DT density. The DT density can be related to an aerial density of DT shapes (components) relative to an overall tile size or group of tiles.

Figure 3:
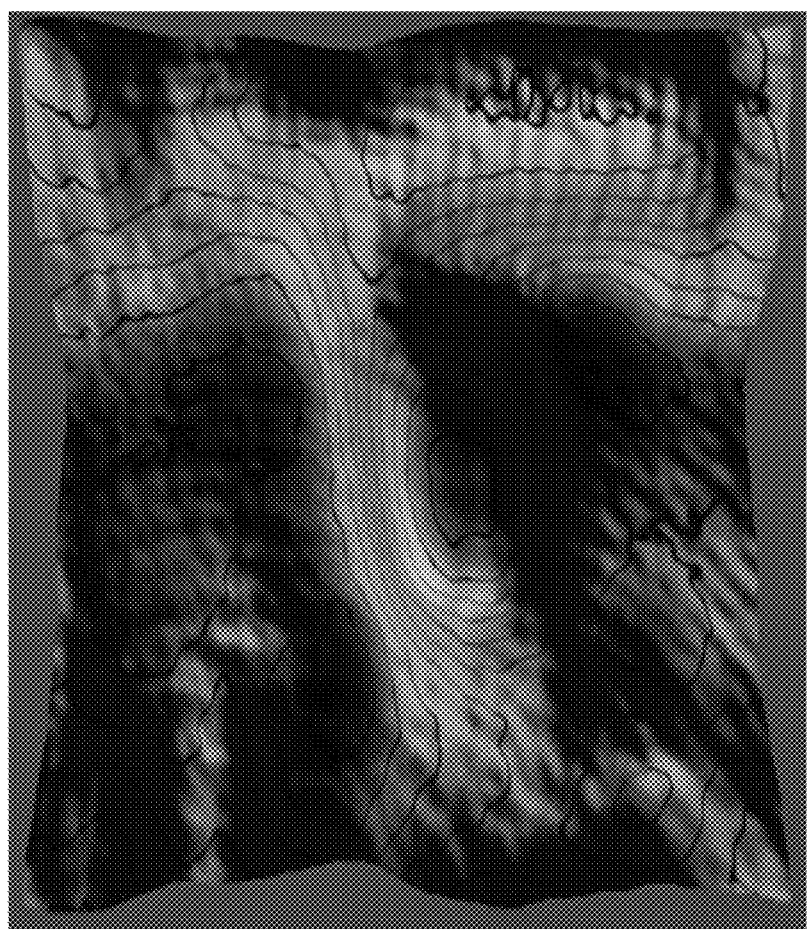
FIG. 3 is an illustration of a distortion data gradient plot according to one or more embodiments of the present invention.

FIG. 3 depicts an exemplary distortion data 300 gradient plot for the DT density map 200 in which aspects of the illustrative embodiments of the present invention may be implemented. During an annealing process, DT structures/components (i.e., DT decoupling capacitors (noise control), DT fill (i.e., fill space used to fulfill predetermined ground rules), embedded DRAM (eDRAM) and DT moats (isolation)) associated with the semiconductor chip can shrink. Different component types shrink at different rates creating gradients within regions of the semiconductor chip or the entire semiconductor chip. High gradients can introduce stresses to the semiconductor chip leading to out-of-plane chip distortions. Out-of-plane chip distortions can cause a variety of issues for portions of the semiconductor chip or the entire semiconductor chip, including inoperability of the semiconductor chip.

In order to reduce the likelihood of operability issues being encountered when physical devices are produced from the floorplan 100, modeling of the design associated with floorplan 100 can be conducted to determine the effects of stress on the semiconductor chip. Modeling can be initially based on a rough floorplan in which DT density estimates are assigned to components and/or regions of the semiconductor chip. Distortions for the semiconductor chip greater than, for example, 50 nanometers (nm) can lead poor performance and/or inoperability for all or a portion of the semiconductor chip. Accordingly, having a sense of stresses encountered by components while at a floorplan stage is highly beneficial because designers can redesign the floorplan should the modeling of the semiconductor chip design indicate that a resulting amount of chip distortion (i.e. greater than 50 nm) would result in poor performance or inoperability. The redesign can be iterative and lead to actual DT densities being assigned to components and/or regions of the semiconductor chip once the modeled distortion for the semiconductor chip is below a distortion threshold, for example, below 50 nm.

Figure 4:
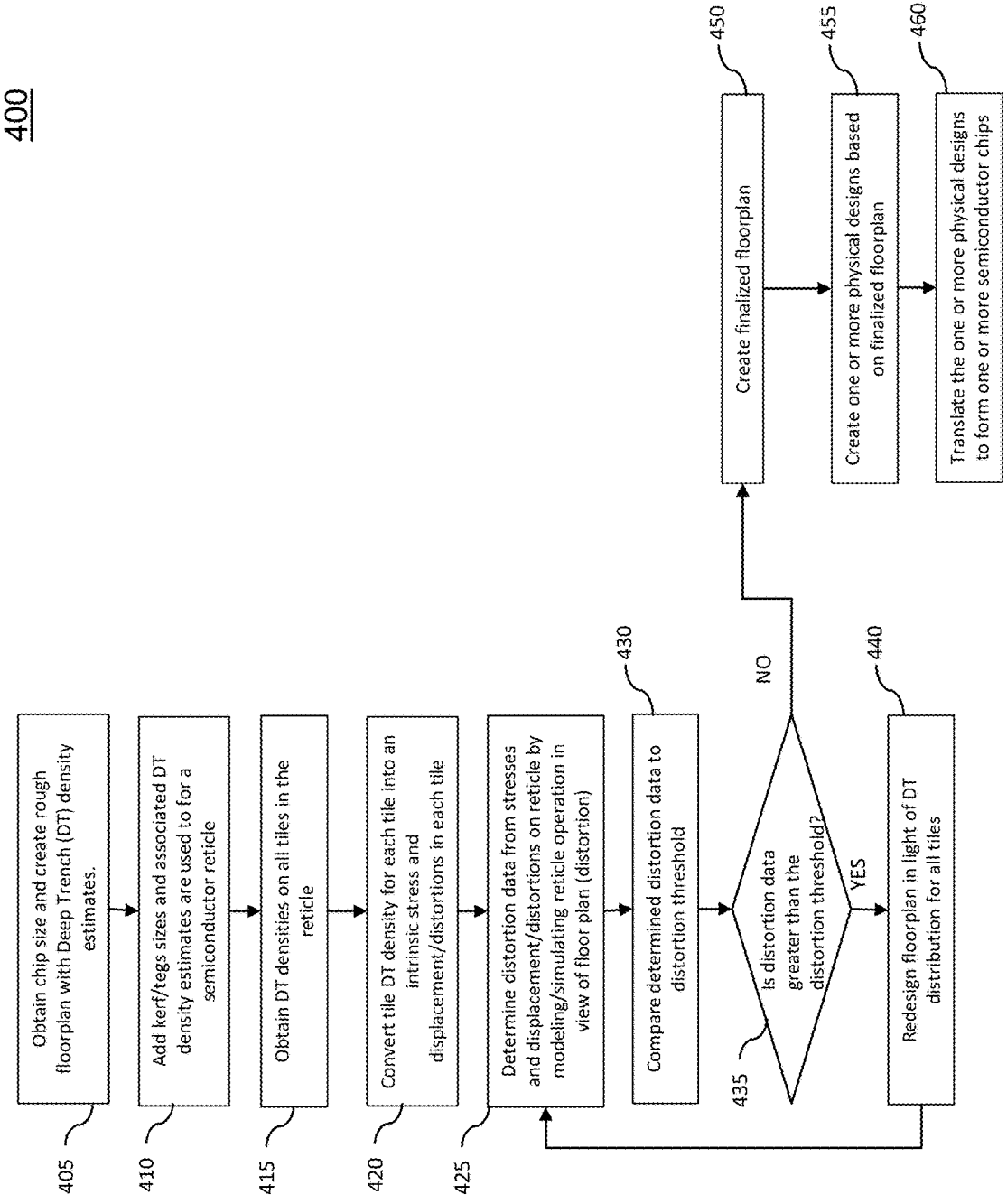
FIG. 4 is a flow diagram illustrating a method for designing physical devices using an iterative floorplan methodology according to one or more embodiments of the present invention.

FIG. 4 is a flow diagram 400 illustrating a computer-implemented method for designing physical devices using an iterative floorplan methodology according to one or more embodiments of the present invention. At block 405, the computer-implemented method obtains a desired chip size (e.g., 20 mm wide by 25 mm high) to be tested, as well as a rough floorplan for association with a semiconductor chip to be tested. The floorplan can include deep trench (DT) density estimates for components included in the floorplan. The DT estimates can be based on established density ground rules, for example, having a minimum DT density in each tile less than 1% and a maximum overall semiconductor chip DT density of 7%. At block 410, kerf (i.e., groove widths in the semiconductor chip) and tegs (i.e., test element groups) along with their associated DT density estimates are added to form a reticle.

At block 415, DT densities for all tiles in the reticle can be obtained. The DT density for a particular tile can be based on an associated desired functionality of one or more macros/components associated with the tile. For example, in FIG. 1, components 105 and 115 can be designed by a designer to have a 66% functional region with a 4% DT density and 33% white space. The designer can also design component 110 to have a 40% functional region with 4% DT, a 40% functional region with 6% DT, and 20% white space. At this stage of floorplan design, the designer can have some flexibility with one or more tiles (e.g., changing DT percentages for components or white spaces).

At block 420, the computer-implemented method the DT density of each tile is converted to stresses. For example, tile DT density for each tile can be converted into an intrinsic stress based on an upper top approximately 3 um, which is a typical depth of the deep trench. A semiconductor reticle tile geometry (including chip, kerf, and tegs) and densities can also be obtained and may include a third dimension of the semiconductor wafer of approximately 700 um with a top 3 um of the semiconductor wafer as DT tiled material thereby defining periodic boundary conditions at semiconductor reticle edges to represent a full semiconductor wafer.

At block 425, the computer-implemented method can determine stresses on the tile by modeling/simulating semiconductor reticle operations associated with the floorplan to obtain distortion data (i.e., out-of-plane displacement) and distortion data ranges (i.e., a range of maximum to minimum values of the distortions). A simulation tool/software can be utilized to conduct the modeling/simulation of the semiconductor reticles, for example, a finite element stress simulation tool like Sentaurus or ABAQUS (references). At block 430, the obtained distortion data range is compared to a distortion threshold, for example 50 nm. At block 435, if the distortion data range is above the threshold, method 400 proceeds to block 440, where the designer is instructed to redesign the floorplan. The redesign can entail changing DT densities for one or more components or white spaces associated with the tile. After the redesign, the method 400 returns to block 425.

At block 435, if the distortion data range is below the threshold, method 400 proceeds to block 450 where a finalized floorplan is created, which includes resolved actual DT values for the components and white spaces. At block 455, one or more physical designs are created based on the finalized floorplan and actual DT values. The one or more physical designs can be translated during semiconductor processing to form one or more physical devices (i.e., semiconductor chips).

Accordingly, instead of waiting till later stages of chip design or while the chip is in production, embodiments of the present invention can consider and address DT densities in tiles at the floorplan stage, i.e., before the semiconductor chip has been physically designed. Embodiments of the present invention can also reduce chip waste because designs having an inordinate amount of chip distortion are flagged for redesign at the floorplan stage thereby limiting the production of physical devices which could be problematic due to poor floorplan design.

While embodiments of the present invention discuss deep trench induced stress driven distortions, embodiments of the present invention can also be applied to stress inducing materials and mechanisms driven by density gradients and non-uniformities in other tile levels (for example, an active area or the first metal level (M1)).

A system, a method, and/or computer program product disclosed herein can calculate distortions by dividing up a reticle into approximately 100-200 um square or rectangular tiles. Each tile can have a density allocation based on a floorplan perspective of what each tile contains. Each tile may have logic eDRAM, white space, IOs, etc. A functional need for eDRAM, logic, cores, IOs, etc., are placed on a semiconductor chip at a high level and the density of each tile can be a composite of the function in the tile. For example, a tile can exist at 0% because the tile contains all white space with assigned white space value being 0% to 14%, for example. In some tiles, parts can exist as eDRAM arrays and in other tiles parts can exist as logic. A part of a tile could be eDRAM, white space, or logic. Each tile could potentially be adjusted between 0% and a maximum DT density depending on a functional content of the tile. Each tile can have a unique DT density.

Tiles can be used to calculate out-of-plane distortions. The DT densities of tiles can also include macros for a kerf test. All the tiles can then be merged to obtain the fully tiled reticle DT density. 3D stress simulations can be conducted for the full reticle. Out-of-plane displacements (or distortions) can also be obtained. If a first pass distortion simulation shows that an amount of distortion is outside a process window, a redesign of the DT density maps for all tiles is conducted for a final floorplan design to meets distortion/displacement limits.

For the second pass, based on the displacement simulations of the first pass, changes can be made in all regions of the chip simultaneously (some changes are made where regions are small and DT density changes can be small, some changes are made where regions and density changes are large, some changes are made where regions are small and density changes are large, and some changes are made where regions are large and density changes are small). The changes can be made to each tile or to a group(s) of tiles, or parts of a tile.

Adjustments to tile densities can be made through macroscopic changes in white space densities in various functional features. Also, tiles can be individually changed by changing regional definitions and characteristics. For example, I/Os could have 3% DT density in their whitespace, while logic could be 2% DT density in their white space, while logic itself can be surrounded at 1%, eDRAM whitespace could be 1%, etc. Density changes can be further controlled by adjusting DT fill and DT decoupling capacitors (also known as decaps).

Based on the distortions from the first pass floorplan simulations and after examining the low and high spots in displacements along with the displacement gradients, changes in regions are likely to improve the second pass of distortion simulations. This regional "change" can be obtained by forcing changes in white space DT density percentages differently in IOs, cores, eDRAMs, logic, etc., in order to ensure all regions are affected simultaneously. These changes can be run through a floorplan DT distributor to determine the new DT densities that can meet an electrical functionality needed for all regions and tiles. Additional simulations of out-of-plane mechanical distortions can again be conducted, and if the distortions are within processable limits, the floorplan can be finalized and physical device production can commence. If the distortions are not within processable limits, additional floorplan iterations are conducted.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for designing physical devices using an iterative floorplan methodology, the method comprising:
   creating, using a processor, a rough floorplan, wherein the rough floorplan includes one or more tiles and estimates for one or more components associated with the rough floorplan;
   converting, using the processor, the estimates for the one or more components to stresses and displacements/distortions associated with the one or more tiles;
   generating, using the processor, distortion data from the displacements/distortions associated with the one or more tiles;
   comparing, using the processor, the distortion data to a threshold;
   in response to the distortion data being above the threshold, creating a modified floorplan based on the rough floorplan by increasing a deep trench (DT) density in at least one of the one or more tiles and decreasing the DT density in at least one of the one or more tiles;
   generating, using the processor, updated distortion data associated with the modified floorplan; and
   creating a finalized floorplan, using the processor, based on the modified floorplan in response to the updated distortion data being below the threshold.

2. The computer-implemented method of claim 1, wherein the estimates are related to at least one of: a deep trench (DT) density, an active area and a first metal level.

3. The computer-implemented method of claim 1, further comprising creating one or more physical devices using the finalized floorplan.

4. The computer-implemented method of claim 1, wherein the threshold is based on a DT density distribution across the one or more tiles.

5. The computer-implemented method of claim 1, wherein the threshold is set based on a process limit.

6. The computer-implemented method of claim 1, wherein the distortion data is in reference to DT density gradients.

7. The computer-implemented method of claim 1, wherein the one or more components include one or more deep trenches.

8. The computer-implemented method of claim 7, wherein the one or more deep trenches include one or more DT decoupling capacitors, DT fill, embedded DRAM (eDRAM) and DT moats.

9. A computer program product for designing physical devices using an iterative floorplan methodology, the computer program product comprising:
   a computer readable storage medium having stored thereon first program instructions executable by a processor to cause the processor to:
      create a rough floorplan, wherein the rough floorplan includes one or more tiles and estimates for one or more components associated with the rough floorplan;
      convert the estimates for the one or more components to stresses and displacements/distortions associated with the one or more tiles;
      generate distortion data from the displacements/distortions associated with the one or more tiles;
      compare the distortion data to a threshold;

in response to the distortion data being above the threshold, create a modified floorplan based on the rough floorplan by increasing a deep trench (DT) density in at least one of the one or more tiles and decreasing the DT density in at least one of the one or more tiles;

generate updated distortion data associated with the modified floorplan; and create a finalized floorplan based on the modified floorplan in response to the updated distortion data being below the threshold.

10. The computer program product of claim 9, further comprising creating one or more physical devices using the finalized floorplan.

11. The computer program product of claim 9, wherein the threshold is based on a DT density distribution across the one or more tiles.

12. The computer program product of claim 9, wherein the threshold is 50 nanometers.

13. The computer program product of claim 9, wherein the estimates are related to at least one of: a deep trench (DT) density, an active area and a first metal level.

14. The computer program product of claim 9, wherein the distortion data is in reference to DT density gradients.

15. The computer program product of claim 9, wherein the one or more components include one or more deep trenches.

16. The computer program product of claim 15, wherein the one or more deep trenches include one or more DT decoupling capacitors, DT fill, embedded DRAM (eDRAM) and DT moats.

17. A system, comprising:
one or more processors; and
at least one memory, the memory including instructions that, upon execution by at least one of the one or more processors, cause the system to perform a method for designing physical devices using an iterative floorplan methodology, the method comprising:

creating a rough floorplan, wherein the rough floorplan includes one or more tiles and estimates for one or more components associated with the rough floorplan;

converting the estimates for the one or more components to stresses and displacements/distortions associated with the one or more tiles;

generating distortion data from the displacements/distortions associated with the one or more tiles;

comparing the distortion data to a threshold;

in response to the distortion data being above the threshold, creating a modified floorplan based on the rough floorplan by increasing a deep trench (DT) density in at least one of the one or more tiles and decreasing the DT density in at least one of the one or more tiles;

generating, using the processor, updated distortion data associated with the modified floorplan; and creating a finalized floorplan based on the modified floorplan in response to the updated distortion data being below the threshold.

18. The system of claim 17, further comprising further comprising creating one or more physical devices using the finalized floorplan.

* * * * *